OR T 938,006
Sept. 2, 1975
SUBSTITUTE FOR MISSING OR
J. F. STEPHANY
IMAGING SYSTEM
Filed Oct. 11, 1974
T938,006
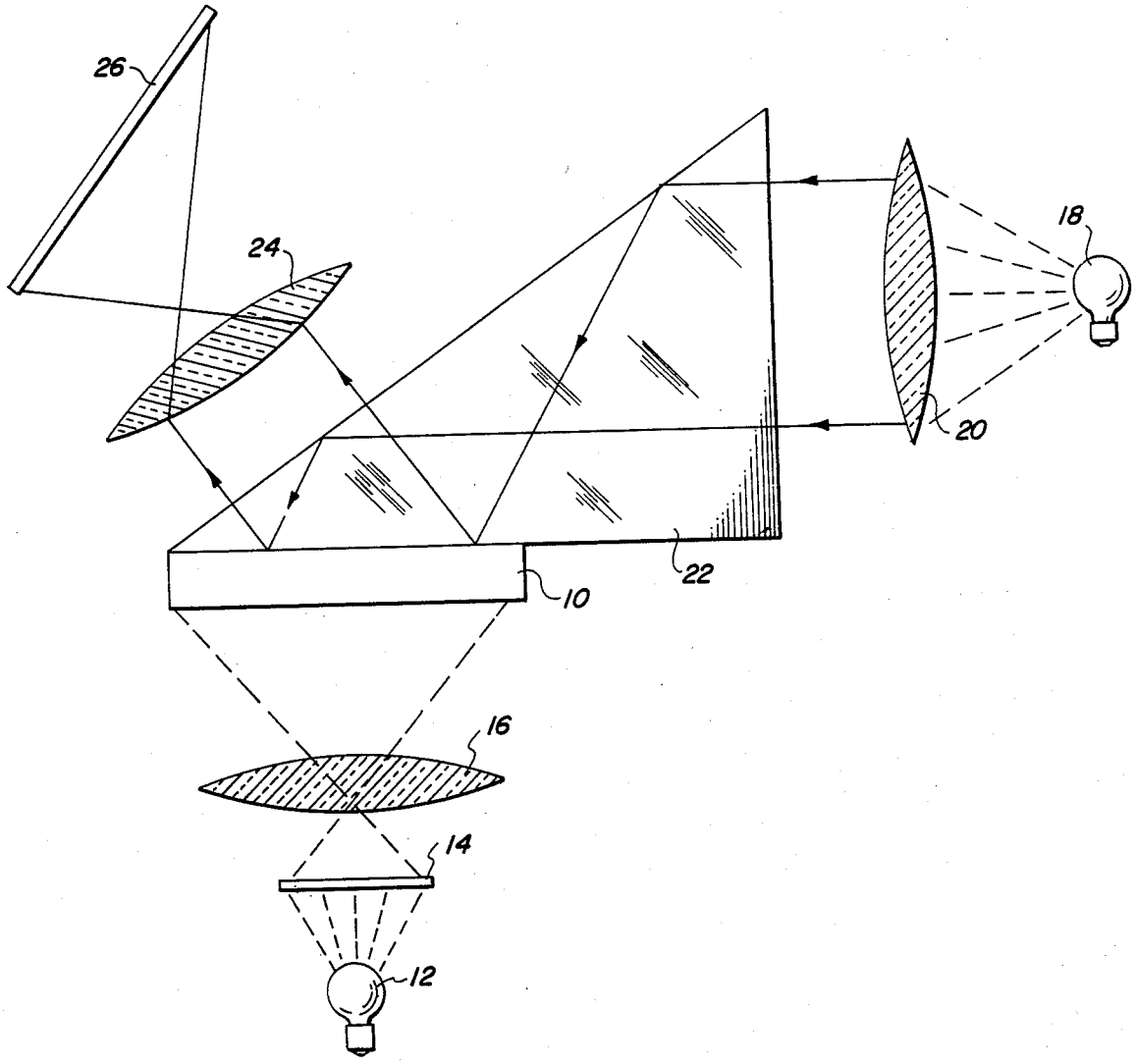

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 7

T938,006
IMAGING SYSTEM
Joseph F. Stephany, Sodus, N.Y., assignor to Xerox Corporation, Stamford, Conn.
Filed Oct. 11, 1974, Ser. No. 514,699
Int. Cl. G02f *1/13*
U.S. Cl. 350—160 R
1 Sheet Drawing. 6 Pages Specification

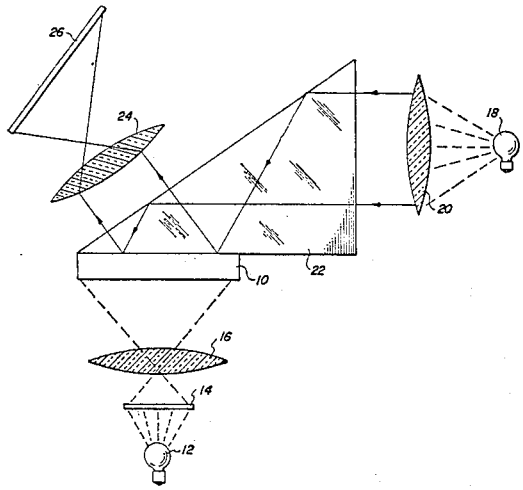

An imaging system including an imaging member in which images having image and background areas which optically affect incident light differently in some respect such as, for example, optical rotation, retardation, dichroism, etc. are formed. The images are read out in reflection by an optical readout system as described in the figure which includes a readout light source is a collimating lens 20, a correction prism 22 arranged adjacent to the imaging member and adapted so that the angle of incidence of the readout illumination to the front surface of the prism is such that it results in total internal reflectance and a field lens 24 which collects the information-modulated illumination focuses it at an output image plane 26. Preferably, the readout illumination is normal to the side surface of the prism and the information-modulated illumination exits normal to the front surface of the prism. In a preferred embodiment the imaged member comprises an optically negative liquid crystalline layer having areas in the Grandjean texture and areas in the focal-conic texture. A preferred imaging member 10 comprises a pair of electrodes at least one of which is transparent sandwiched around a layer of photoconductive insulating material and a layer of an optically negative liquid crystalline material.